(12) United States Patent
Zhang et al.

(10) Patent No.: US 12,309,106 B2
(45) Date of Patent: May 20, 2025

(54) CONFIGURATION OF SETS OF OPERATION PARAMETERS FOR HALF DUPLEX AND FULL DUPLEX MODES

(71) Applicant: QUALCOMM Incorporated, San Diego, CA (US)

(72) Inventors: Qian Zhang, Basking Ridge, NJ (US); Yan Zhou, San Diego, CA (US); Junyi Li, Fairless Hills, PA (US); Peter Gaal, San Diego, CA (US); Navid Abedini, Basking Ridge, NJ (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 426 days.

(21) Appl. No.: 17/810,675

(22) Filed: Jul. 5, 2022

(65) Prior Publication Data
US 2024/0014997 A1    Jan. 11, 2024

(51) Int. Cl.
*H04L 5/16* (2006.01)
(52) U.S. Cl.
CPC ..................... *H04L 5/16* (2013.01)

(58) Field of Classification Search
CPC .......................................................... H04L 5/16
See application file for complete search history.

(56) References Cited

U.S. PATENT DOCUMENTS

| 2020/0305027 A1* | 9/2020 | Manolakos | H04W 72/0446 |
| 2022/0104245 A1* | 3/2022 | Xu | H04W 72/23 |
| 2022/0201668 A1* | 6/2022 | Balasubramanian | H04W 24/08 |

* cited by examiner

*Primary Examiner* — Duc C Ho
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network entity, a configuration of multiple sets of operation parameters associated with the network entity, wherein the multiple sets of operation parameters include one or more sets of operation parameters associated with a full duplex mode of the network entity and one or more sets of operation parameters associated with a half duplex mode of the network entity. The UE may transmit, to the network entity, a communication using a selected one of the multiple sets of operation parameters. Numerous other aspects are described.

26 Claims, 9 Drawing Sheets

CONFIGURATION OF SETS OF OPERATION PARAMETERS FOR HALF DUPLEX AND FULL DUPLEX MODES

FIELD OF THE DISCLOSURE

Aspects of the present disclosure generally relate to wireless communication and to techniques and apparatuses for configuration of sets of operation parameters for half duplex and full duplex modes.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a network entity, a configuration of multiple sets of operation parameters associated with the network entity, wherein the multiple sets of operation parameters include one or more sets of operation parameters associated with a full duplex mode of the network entity and one or more sets of operation parameters associated with a half duplex mode of the network entity. The method may include transmitting, to the network entity, a communication using a selected one of the multiple sets of operation parameters.

Some aspects described herein relate to a method of wireless communication performed by a network entity. The method may include transmitting, to a UE, a configuration of multiple sets of operation parameters associated with the network entity, wherein the multiple sets of operation parameters include one or more sets of operation parameters associated with a full duplex mode of the network entity and one or more sets of operation parameters associated with a half duplex mode of the network entity. The method may include receiving, from the UE, a communication using a selected one of the multiple sets of operation parameters.

Some aspects described herein relate to an apparatus for wireless communication at a UE. The apparatus may include a memory and one or more processors coupled to the memory. The memory may comprise instructions executable by the one or more processors to cause the apparatus to receive, from a network entity, a configuration of multiple sets of operation parameters associated with the network entity, wherein the multiple sets of operation parameters include one or more sets of operation parameters associated with a full duplex mode of the network entity and one or more sets of operation parameters associated with a half duplex mode of the network entity. The one or more processors may be configured to transmit, to the network entity, a communication using a selected one of the multiple sets of operation parameters.

Some aspects described herein relate to an apparatus for wireless communication at a network entity. The apparatus may include a memory and one or more processors coupled to the memory. The memory may comprise instructions executable by the one or more processors to cause the apparatus to transmit, to a UE, a configuration of multiple sets of operation parameters associated with the network entity, wherein the multiple sets of operation parameters include one or more sets of operation parameters associated with a full duplex mode of the network entity and one or more sets of operation parameters associated with a half duplex mode of the network entity. The one or more processors may be configured to receive, from the UE, a communication using a selected one of the multiple sets of operation parameters.

Some aspects described herein relate to a non-transitory computer-readable medium that stores a set of instructions for wireless communication by a UE. The set of instructions, when executed by one or more processors of the UE, may cause the UE to receive, from a network entity, a configuration of multiple sets of operation parameters associated with the network entity, wherein the multiple sets of operation parameters include one or more sets of operation parameters associated with a full duplex mode of the network entity and one or more sets of operation parameters associated with a half duplex mode of the network entity. The set of instructions, when executed by one or more processors of the UE, may cause the UE to transmit, to the network entity, a communication using a selected one of the multiple sets of operation parameters.

Some aspects described herein relate to a non-transitory computer-readable medium that stores a set of instructions for wireless communication by a network entity. The set of instructions, when executed by one or more processors of the network entity, may cause the network entity to transmit, to a UE, a configuration of multiple sets of operation parameters associated with the network entity, wherein the multiple sets of operation parameters include one or more sets of operation parameters associated with a full duplex mode of the network entity and one or more sets of operation parameters associated with a half duplex mode of the network entity. The set of instructions, when executed by one or more processors of the network entity, may cause the network entity to receive, from the UE, a communication using a selected one of the multiple sets of operation parameters.

Some aspects described herein relate to an apparatus for wireless communication. The apparatus may include means for receiving, from a network entity, a configuration of multiple sets of operation parameters associated with the network entity, wherein the multiple sets of operation parameters include one or more sets of operation parameters associated with a full duplex mode of the network entity and one or more sets of operation parameters associated with a half duplex mode of the network entity. The apparatus may include means for transmitting, to the network entity, a communication using a selected one of the multiple sets of operation parameters.

Some aspects described herein relate to an apparatus for wireless communication. The apparatus may include means for transmitting, to a UE, a configuration of multiple sets of operation parameters associated with the apparatus, wherein the multiple sets of operation parameters include one or more sets of operation parameters associated with a full duplex mode of the apparatus and one or more sets of operation parameters associated with a half duplex mode of the apparatus. The apparatus may include means for receiving, from the UE, a communication using a selected one of the multiple sets of operation parameters.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
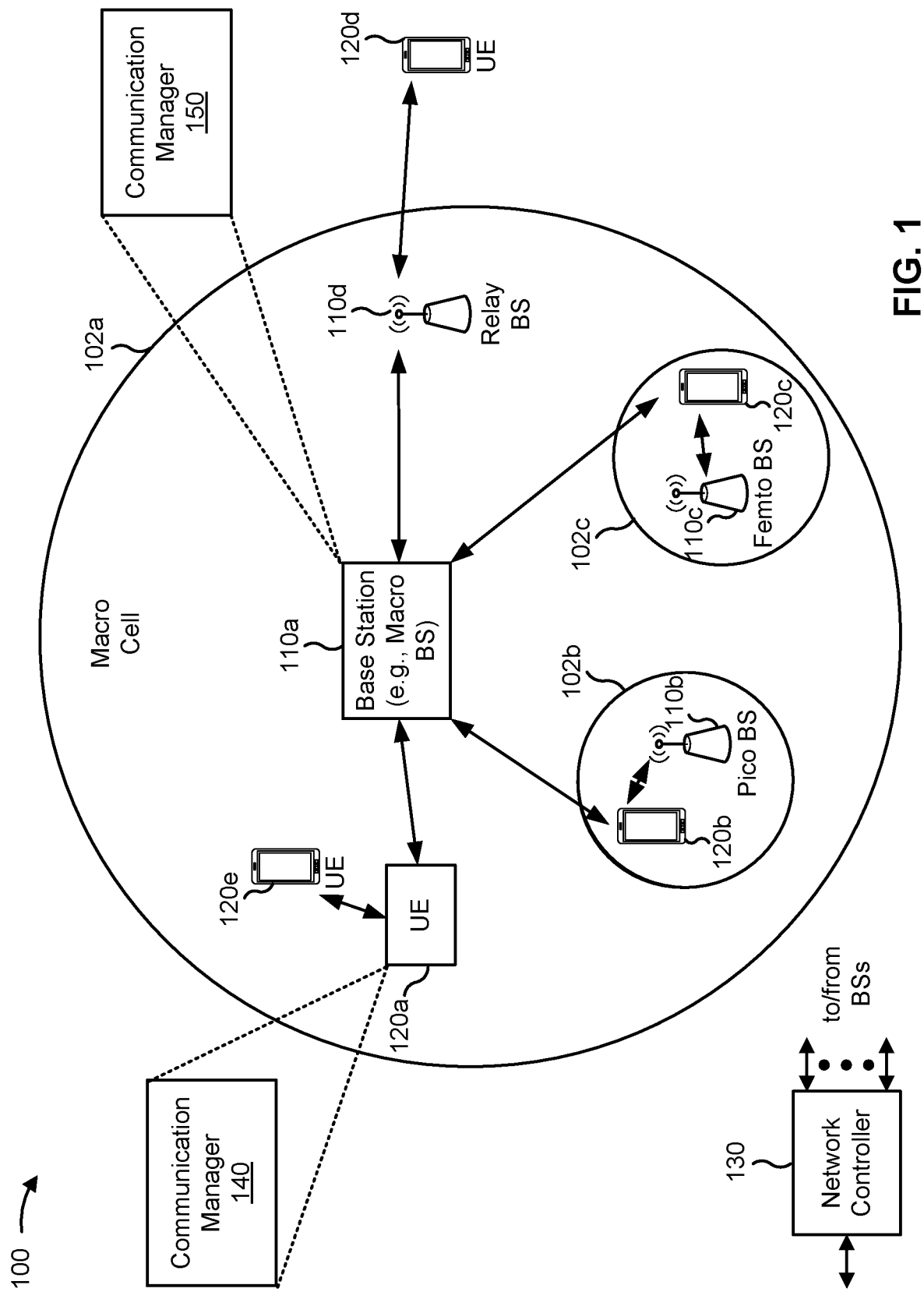
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Moreover, although the base station 110 is shown as an integral unit in FIG. 1, aspects of the disclosure are not so limited. In some other aspects, the functionality of the base station 110 may be disaggregated according to an open radio access network (O-RAN) architecture or the like, which is described in more detail in connection with FIG. 3. Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network entity, a configuration of multiple sets of operation parameters associated with the network entity, wherein the multiple sets of operation parameters include one or more sets of operation parameters associated with a full duplex mode of the network entity and one or more sets of operation parameters associated with a half duplex mode of the network entity; and transmit, to the network entity, a communication using a selected one of the multiple sets of operation parameters. Additionally, or alternatively, the communication manager 140 may perform one or more other operations described herein.

In some aspects, the network entity described elsewhere herein may correspond to the base station 110. in some aspects, the network entity may include a communication manager 150. As described in more detail elsewhere herein, the communication manager 150 may transmit, to a UE, a configuration of multiple sets of operation parameters associated with the network entity, wherein the multiple sets of operation parameters include one or more sets of operation parameters associated with a full duplex mode of the network entity and one or more sets of operation parameters associated with a half duplex mode of the network entity; and receive, from the UE, a communication using a selected one of the multiple sets of operation parameters. Additionally, or alternatively, the communication manager 150 may perform one or more other operations described herein.

As indicated above, FIG. 1 is provided as an example. Other examples may differ from what is described with regard to FIG. 1.

Figure 2:
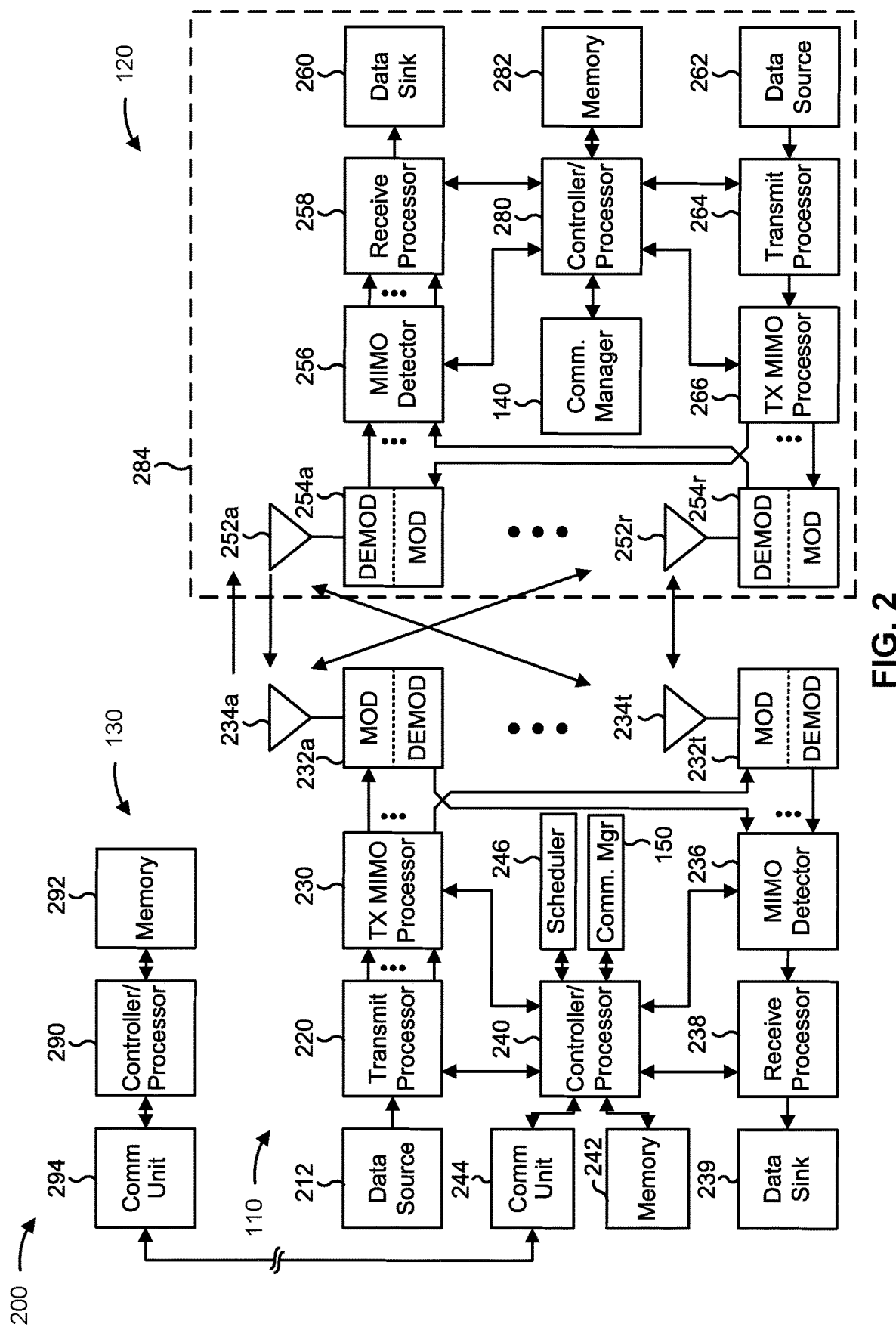
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the base station 110, the controller/processor 280 of the UE 120, and/or any other component(s) of FIG. 2 may perform one or more techniques associated with configuration of sets of operation parameters for half duplex and full duplex modes, as described in more detail elsewhere herein. In some aspects, the network entity described herein is the base station 110, is included in the base station 110, or includes one or more components of the base station 110 shown in FIG. 2. The controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE 120 includes means for receiving, from a network entity, a configuration of multiple sets of operation parameters associated with the network entity, wherein the multiple sets of operation parameters include one or more sets of operation parameters associated with a full duplex mode of the network entity and one or more sets of operation parameters associated with a half duplex mode of the network entity; and/or means for transmitting, to the network entity, a communication using a selected one of the multiple sets of operation parameters. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network entity (e.g., the base station 110) includes means for transmitting, to a UE, a configuration of multiple sets of operation parameters associated with the network entity, wherein the multiple sets of operation parameters include one or more sets of operation parameters associated with a full duplex mode of the network entity and one or more sets of operation parameters associated with a half duplex mode of the network entity; and/or means for receiving, from the UE, a communication using a selected one of the multiple sets of operation parameters. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
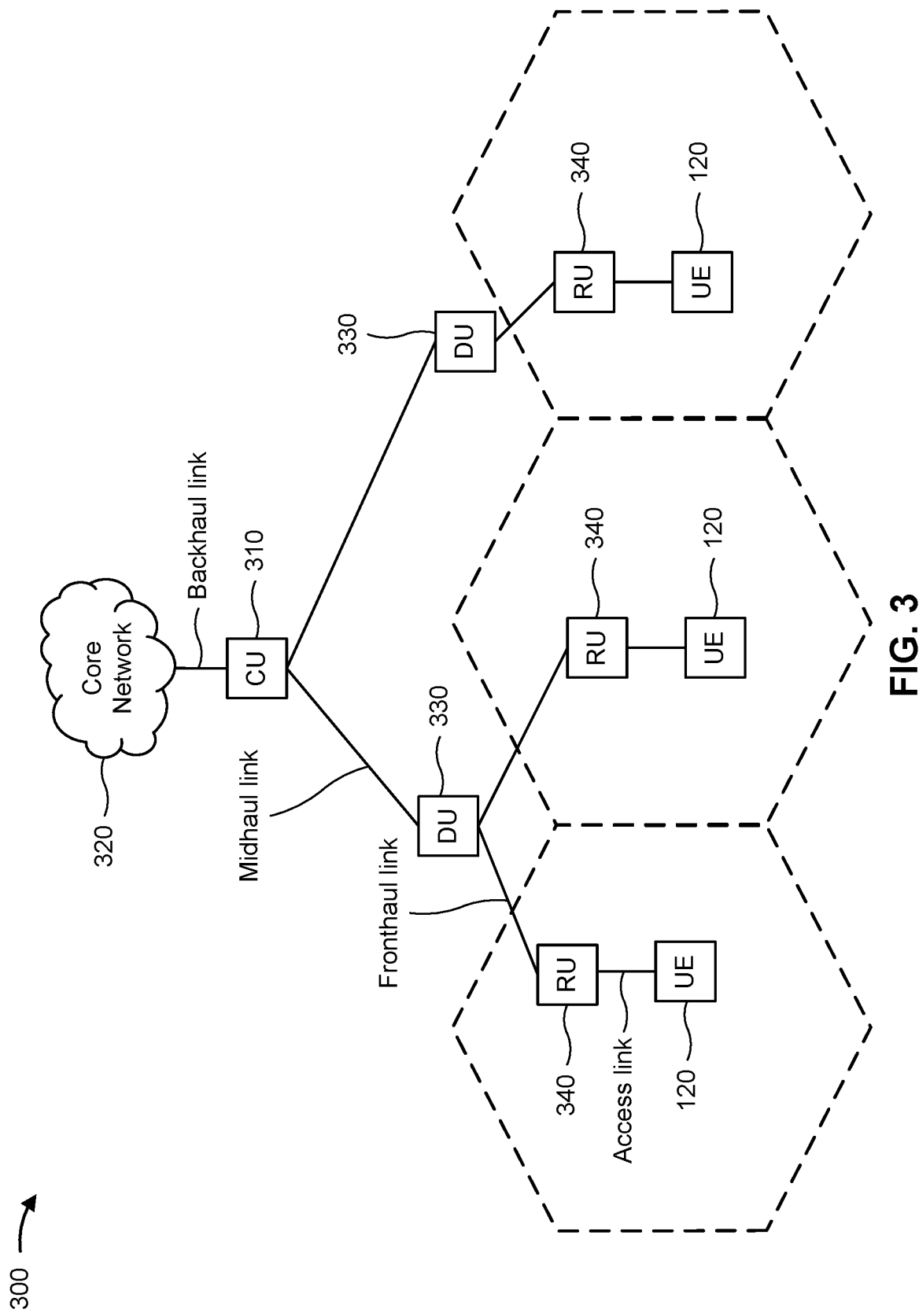
FIG. 3 is a diagram illustrating an example of an open radio access network architecture, in accordance with the present disclosure.

FIG. 3 is a diagram illustrating an example 300 of an O-RAN architecture, in accordance with the present disclosure. As shown in FIG. 3, the O-RAN architecture may include a centralized unit (CU) 310 that communicates with a core network 320 via a backhaul link. Furthermore, the CU 310 may communicate with one or more distributed units (DUs 330) via respective midhaul links. The DUs 330 may each communicate with one or more radio units (RUs) 340 via respective fronthaul links, and the RUs 340 may each communicate with respective UEs 120 via radio frequency (RF) access links. The DUs 330 and the RUs 340 may also be referred to as O-RAN DUs (O-DUs) 330 and O-RAN RUs (O-RUs) 340, respectively.

In some aspects, the DUs 330 and the RUs 340 may be implemented according to a functional split architecture in which functionality of a base station 110 (e.g., an eNB or a gNB) is provided by a DU 330 and one or more RUs 340 that communicate over a fronthaul link. Accordingly, as described herein, a base station 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

As indicated above, FIG. 3 is provided as an example. Other examples may differ from what is described with regard to FIG. 3.

Figure 4B:
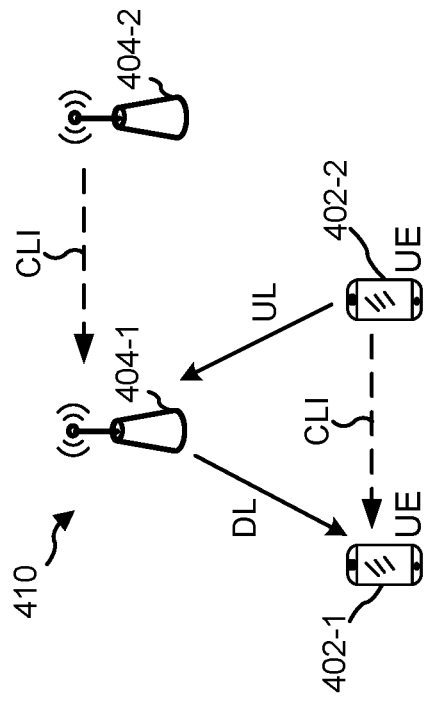
FIGS. 4A-4C are diagrams illustrating examples of full duplex communication in accordance with the present disclosure.
Figure 4C:
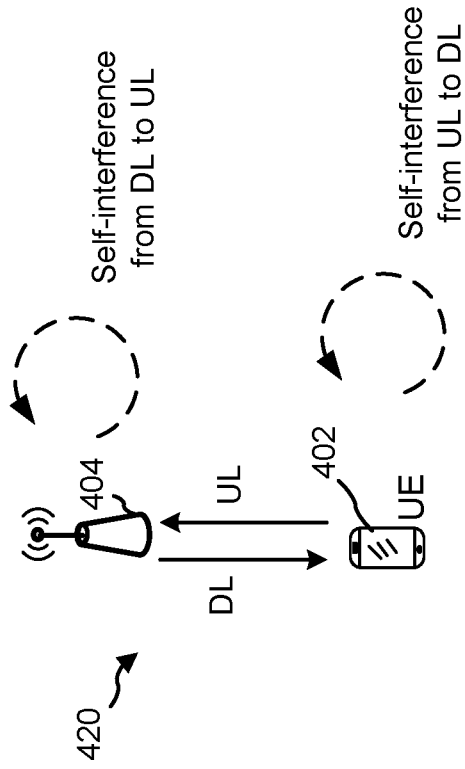
Figure 4A:
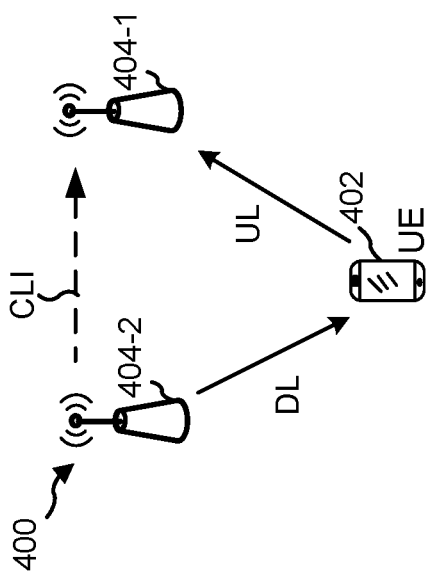

FIGS. 4A-4C are diagrams illustrating examples 400, 410, 420 of full duplex (FD) communication in accordance with the present disclosure. An FD communication is a communication that utilizes overlapped time resources at a single node (such as a UE or a network entity, such as a TRP, a base station 110, a CU 310, a DU 330, or an RU 340) for transmission and reception. For example, a UE or a network entity may perform a transmission and a reception using the same time resources, such as via frequency division multiplexing (FDM) or spatial division multiplexing (SDM). "FDM" refers to performing two or more communications using different frequency resource allocations. "SDM" refers to performing two or more communications using different spatial parameters, such as different transmission configuration indicator (TCI) states corresponding to beams. An SDM communication can use overlapped time resources and frequency resources, and an FDM communication can use overlapped time resources and spatial resources (that is, overlapped beam parameters, TCI states, or the like). A TCI state indicates a spatial parameter for a communication. For example, a TCI state for a communication may identify a source signal (such as a synchronization signal block, a channel state information reference signal, or the like) and a spatial parameter to be derived from the source signal for the purpose of transmitting or receiving the communication. For example, the TCI state may indicate a quasi-colocation (QCL) type. A QCL type may indicate one or more spatial parameters to be derived from the source signal. The source signal may be referred to as a QCL source. FD communications can include dynamic traffic (such as scheduled by downlink control information (DCI)) and/or semi-static traffic. Semi-static traffic is traffic associated with a semi-persistent resource, such as a semi-persistent scheduling (SPS) configured resource or a configured grant (CG).

The example 400 of FIG. 4A includes a UE 402 and two network entities 404 (e.g., a first network entity 404-1 and a second network entity 404-2), wherein the UE 402 is sending uplink transmissions to the first network entity 404-1 and is receiving downlink transmissions from the second network entity 404-2. In the example 400 of FIG. 4A, FD is enabled for the UE 402, but not for the network entities 404. Thus, the network entities 404 are half duplex (HD) network entities.

The example 410 of FIG. 4B includes two UEs 402 (e.g., a first UE 402-1 and a second UE 402-2), and a first network entity 404-1, wherein the first UE 402-1 is receiving a downlink transmission from the first network entity 404-1 and the second UE 402-2 is transmitting an uplink transmission to the first network entity 404-1. In the example 410 of FIG. 4B, FD is enabled for the first network entity 404-1, but not for the first UE 402-1 and the second UE 402-2. Thus, the first UE 402-1 and the second UE 402-2 are HD UEs. The example 410 of FIG. 4B also includes a second network entity 404-2, which may cause interference to the first network entity 404-1, described in more detail below.

The example 420 of FIG. 4C includes a UE 402 and a network entity 404, wherein the UE 402 is receiving a downlink transmission from the network entity 404 and the UE 402 is transmitting an uplink transmission to the network entity 404. In the example 420 of FIG. 4C, FD is enabled for both the UE 402 and the network entity 404. In the example 420 of FIG. 4C, the UE 402 and the network entity 404 communicate using a beam pair. A beam pair may include a downlink beam and an uplink beam. For example, a UE 402 may use a beam pair that includes a downlink beam (that is, a receive beam) at the UE 402 and an uplink beam (that is, a transmit beam) at the UE 402 to communicate with the network entity 404. The network entity 404 may use a downlink beam (that is, a transmit beam) at the network entity 404 to transmit communications received via the UE 402's downlink beam, and may use an uplink beam (that is, a receive beam) at the network entity 404 to receive communications transmitted via the UE 402's uplink beam.

In FIGS. 4A-4C, interference is indicated by dashed lines. Interference can occur between nodes of examples 400, 410, 420 (referred to as "crosslink interference" (CLI)). Examples of CLI are shown in FIGS. 4A and 4B. In FIG. 4A, the second network entity 404-2's downlink transmission interferes with the first network entity 404-1's uplink transmission. In FIG. 4B, the first UE 402-1's uplink transmission interferes with the second UE 402-2's downlink transmission, and a downlink transmission of the second network entity 404-2 interferes with the first network entity 404-1's uplink transmission. In some cases, self-interference can occur. Self-interference occurs when a node's transmission interferes with a reception operation of the node. For example, self-interference may occur due to reception by a receive antenna of radiated energy from a transmit antenna, cross-talk between components, or the like. Examples of self-interference at a UE 402 (from an uplink transmission to a downlink reception) and at a network entity 404 (from a downlink transmission to an uplink reception) are shown in FIG. 4C. It should be noted that the above-described CLI and self-interference conditions can occur in HD deployments and in FD deployments.

In some aspects, a network entity (e.g., one of the network entities 404 shown in FIGS. 4A-4C, or a similar network entity) may dynamically switch between an HD mode and an FD mode. Accordingly, the network entity may configure an associated UE (e.g., one of the UEs 402 shown in FIGS. 4A-4C, or a UE) with various operation parameters when switching between modes such that the UE may continue to communicate with the network entity in the new mode. For example, a UE may connect to a network entity operating in an HD mode, and the network entity may thus configure the UE with certain HD operation parameters such as a downlink or uplink power control parameter associated with HD operation, a reception or transmission timing parameter associated with HD operation, a downlink or uplink beam parameter associated with HD operation, a bandwidth part (BWP) parameter associated with HD operation, a component carrier parameter associated with HD operation, or other parameters associated with HD operation. If the network entity thereafter switches to an FD mode, the network entity may reconfigure the UE accordingly, such as by configuring the UE with certain FD operation parameters such as a downlink or uplink power control parameter associated with FD operation, a reception or transmission timing parameter associated with FD operation, a downlink or uplink beam parameter associated with FD operation, a BWP parameter associated with FD operation, a component carrier parameter associated with FD operation, or other parameters associated with FD operation. Configuring the UE with various operation parameters as the network entity switches between HD and FD modes requires high signaling overhead and resource consumption, resulting in congested channels inefficient network resource utilization.

Some techniques and apparatuses described herein enable configuring a UE with multiple sets of operation parameters associated with a network entity, thereby reducing signaling overhead when the network entity switches between HD and FD operation, or the like. For example, in some aspects, a UE may receive, from a network entity, a configuration of multiple sets of operation parameters associated with the network entity including one or more sets of operation parameters associated with an FD mode of the network entity and one or more sets of operation parameters associated with an HD mode of the network entity. In this regard, when the network entity switches between HD and FD operation, the UE may already be configured with the corresponding operation parameters without requiring additional signaling overhead and/or configuration. In some aspects, the UE may be configured with a semi-static pattern or other pattern indicating when the network entity will be operating in each mode. Accordingly, the UE may implement the various sets of operation parameters in accordance with the semi-static pattern. Based at least in part on the network entity configuring the UE with multiple sets of operation parameters, the UE and/or the network entity may conserve computing, power, network, and/or communication resources that may have otherwise been consumed signaling various parameters when the network entity switches between HD and FD operation or between other operation modes. For example, based at least in part on the network entity configuring the UE with multiple sets of operation parameters, the UE and the network entity may reduce signaling overhead, which may conserve computing, power, network, and/or communication resources that may have otherwise been consumed to signal various configuration parameters to the UE.

As indicated above, FIGS. 4A-4C are provided as one or more examples. Other examples may differ from what is described with regard to FIGS. 4A-4C.

Figure 5:
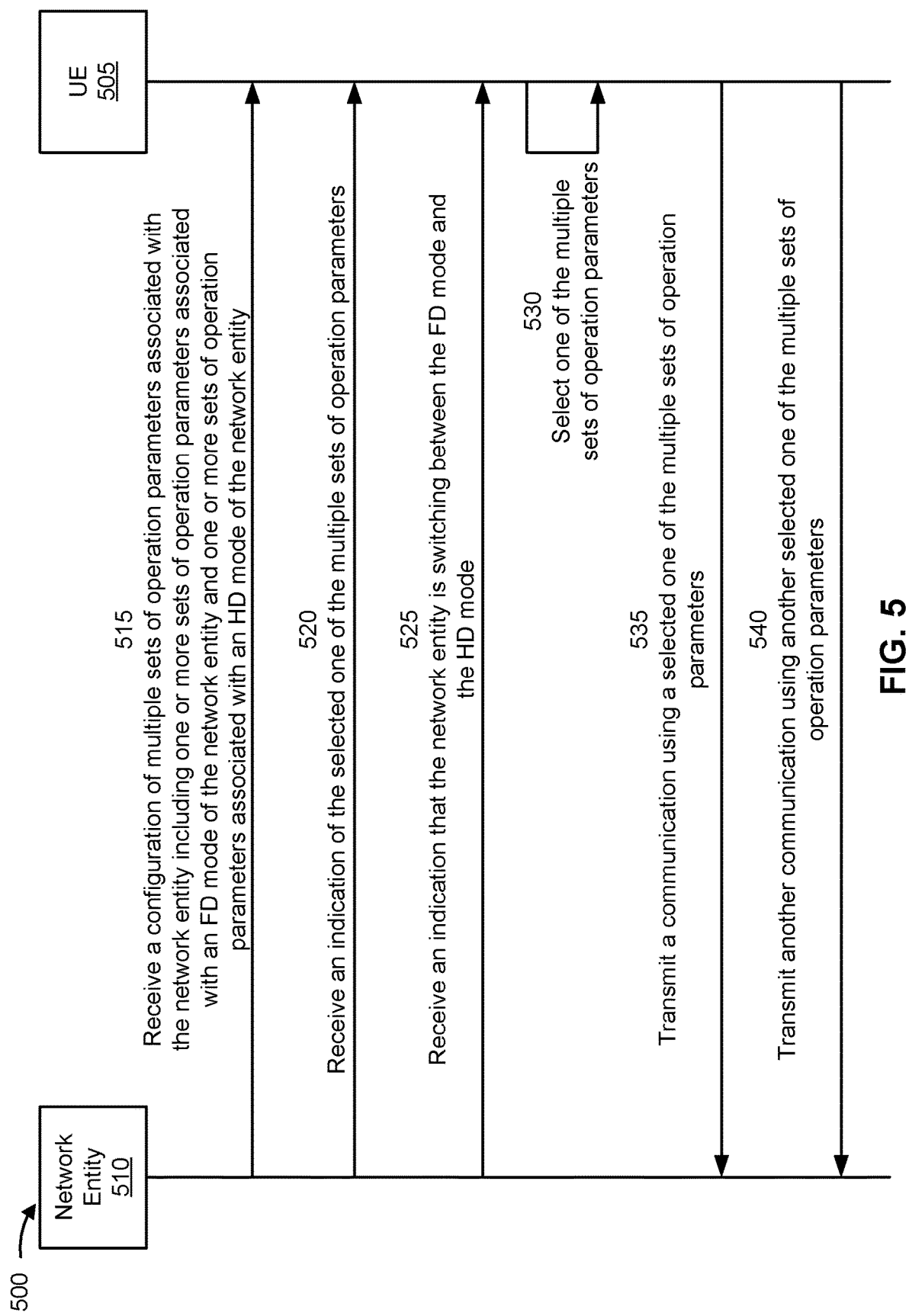
FIG. 5 is a diagram of an example associated with configuration of sets of operation parameters for half duplex and full duplex modes, in accordance with the present disclosure.

FIG. 5 is a diagram of an example 500 associated with configuration of sets of operation parameters for HD and FD modes, in accordance with the present disclosure. As shown in FIG. 5, a UE 505 (e.g., the UE 120, one of the UEs 402 described in connection with FIGS. 4A-4C, or a similar UE) may communicate with a network entity 510 (e.g., a base station 110, a CU 310, a DU 330, an RU 340, one of the network entities 404 described in connection with FIGS. 4A-4C, or a similar network entity). In some aspects, the UE 505 and the network entity 510 may be part of a wireless network (e.g., wireless network 100). The UE 505 and the network entity 510 may have established a wireless connection prior to operations shown in FIG. 5. In some aspects, the network entity 510 may be capable of operating in both an HD mode and an FD mode, such as one of the FD modes described in connection with FIG. 4 or a similar FD mode.

As shown by reference number 515, the UE 505 may receive, from the network entity 510, configuration information. In some aspects, the UE 505 may receive the configuration information via one or more of RRC signaling, one or more MAC control elements (MAC-CEs), and/or DCI, among other examples. In some aspects, the configuration information may include an indication of one or more configuration parameters (e.g., already known to the UE 505 and/or previously indicated by the network entity 510 or other network device) for selection by the UE 505, and/or explicit configuration information for the UE 505 to use to configure the UE 505, among other examples. The UE 505 may configure itself based at least in part on the configuration information. In some aspects, the UE 505 may be configured to perform one or more operations described herein based at least in part on the configuration information.

In some aspects, the configuration information may include a configuration of multiple sets of operation parameters associated with the network entity 510. The multiple sets of operation parameters may include one or more sets of operation parameters associated with an FD mode of the network entity 510 and one or more sets of operation parameters associated with an HD mode of the network entity 510. The sets of operation parameters may include any parameter associated with transmitting and receiving communications, including a downlink and/or an uplink power control parameter, a reception and/or transmission timing parameter, a downlink and/or an uplink beam parameter, a BWP parameter, a component carrier parameter, or a similar parameter.

In this regard, the UE 505 may beneficially be preconfigured with multiple sets of operation parameters such that the UE 505 may seamlessly receive communications from the network entity 510 as the network entity 510 switches between operation modes (e.g., between a first HD mode and a second HD mode, between a first FD mode and a second FD mode, between an HD mode and an FD mode, or the like). More particularly, in some aspects, each operation mode may be associated with a set of operation parameters, such as an HD mode being associated with a one set of operation parameters and an FD mode being associated with another set of operation parameters. Additionally, or alternatively, for each of the HD mode and the FD mode, the UE 505 may be configured with multiple sets of operation parameters. For example, the UE 505 may be configured with multiple sets of operation parameters associated with the FD mode (e.g., a first set of operation parameters and a second set of operation parameters associated with the FD mode), and/or with multiple sets of operation parameters associated with the HD mode (e.g., a third set of operation parameters and a fourth set of operation parameters associated with the HD mode).

In aspects in which multiple sets of operation parameters are associated with the FD mode, each set of operation parameters (e.g., the first set of operation parameters and the second set of operation parameters) may be associated with a different guard band size for frequency division multiplexed (FDMed) communications. More particularly, the first set of operation parameters may be associated with a first guard band size associated with FDMed communications, and the second set of operation parameters may be associated with a second guard band size associated with FDMed communications. In such aspects, the network entity 510 may identify the respective guard band sizes using a BWP identifier information element (IE) or the like. For example, the first set of operation parameters may be associated with a first guard band field associated with a BWP identifier IE, and the second set of operation parameters may be associated with a second guard band field associated with the BWP identifier IE. Alternatively, the network entity 510 may define multiple BWP identifiers, each containing guard band information for a BWP parameter associated with a corresponding parameter set. Put another way, in some aspects, the first set of operation parameters may be associated with a first BWP identifier, and the second set of operation parameters is associated with a second BWP identifier.

In some aspects, a selection of which set of operation parameters to use for a given time period may be implicitly or explicitly indicated to the UE 505. For example, as shown by reference number 520, in some aspects the UE 505 may receive, from the network entity 510, an indication of the selected one of the multiple sets of operation parameters. The indication shown by reference number 520 may be received via a layer 1 communication (e.g., DCI signaling), a layer 2 communication (e.g., MAC-CE signaling), or a layer 3 communication (e.g., RRC signaling). Moreover, in some aspects, the indication shown by reference number 520 may be transmitted only to the UE 505. For example, the indication of the selected one of the multiple sets of operation parameters may be received via a UE-dedicated message. In some other aspects, the indication shown by reference number 520 may be transmitted to multiple UEs, such as multiple UEs connected to the network entity 510. For example, the indication of the selected one of the multiple sets of operation parameters may be received via a group common message, a broadcast message, or a similar message.

In some aspects, the indication shown by reference number 520 or a similar indication may be communicated to the UE 505 each time the network entity 510 is switching between modes. For example, the UE 505 may receive the indication of the selected one of the multiple sets of operation parameters based at least in part on the network entity 510 switching between the FD mode and HD mode, and/or the UE 505 may receive the indication of the selected one of the multiple sets of operation parameters based at least in part on the network entity 510 switching between a first HD/FD mode and a second HD/FD mode. In some aspects, the network entity 510 may signal which of the multiple sets of operation parameters should be used using a number of bits. More particularly, using n bits, the network entity 510 may signal which one of up to $2^n$ sets of operation parameters should be used during a given time window.

In some other aspects, the indication of the selected one of the multiple sets of operation parameters may be semi-statically indicated over a time window. More particularly, the indication of the selected one of the multiple sets of operation parameters may indicate that a first set of operation parameters should be used during a first portion of a time window, that a second set of operation parameters should be used during a second portion of the time window, and so forth. In such aspects, the UE 505 may be pre-configured (via the configuration described in connection with reference number 515, or otherwise) with multiple patterns of sets of operation parameters. In such aspects, the network entity 510 may indicate to the UE 505 which pattern, of the multiple patterns of sets of operation parameters, should be used for a given time window. For example, the indication shown by reference number 520 may indicate a selected pattern of sets of operation parameters, of multiple patterns of sets of operation parameters, to use during a time window. The pattern may indicate to use a first set of operation parameters (such as a set of operation parameters associated with the FD mode) during a first portion of the time window, a second set of operation parameters (such as another set of operation parameters associated with the FD mode) during a second portion of the time window, a third set of operation parameters (such as a set of operation parameters associated with the HD mode) during a third portion of the time window, and so forth. In some aspects, the pattern may repeat, such that the UE 505 continues to switch between sets of operation parameters according to the pattern until the UE 505 receives a subsequent indication indicating that the UE 505 should use a different set of operation parameters and/or indicating that the UE 505 should use a different pattern of sets of operation parameters.

In some other aspects, the UE 505 may not receive explicit signaling or the like indicating which set of operation parameters to use, but nonetheless the set of operation parameters may be implicitly indicated to the UE 505 and/or triggered by certain events. For example, in some aspects, the network entity 510 switching between operation modes (e.g., between an HD mode and an FD mode, or between a first HD/FD mode and a second HD/FD mode) may implicitly indicate to the UE 505 that the UE 505 should switch between sets of operation parameters. Put another way, in some aspects, a selected one of the multiple sets of operation parameters may be indicated based at least in part on the network entity 510 switching between the FD mode and the HD mode, between one FD mode and another FD mode, or between one HD mode and another HD mode. Accordingly, in some aspects, the UE 505 may determine that the network entity 510 switched between an FD mode and an HD mode, or that the network entity switched between one FD mode and another FD mode, or that the network entity 510 switched between one HD mode and another HD mode. In some aspects, the UE 505 may make such a determination based at least in part on signaling from the network entity 510. For example, in some aspects, as shown by reference number 525, the UE 505 may receive an indication that the network entity 510 is switching between the FD mode and the HD mode (or else between one HD/FD mode and another HD/FD mode). Thus, as shown by reference number 530, the UE 505 may select one of the multiple sets of operation parameters based at least in part on receiving an indication that the network entity 510 is switching from the FD mode to the HD mode, between one FD mode and another FD mode, or between one HD mode and another HD mode.

Additionally, or alternatively, the UE 505 may be configured with a default set of operation parameters associated with a default operation mode, and may select the default set of operation parameters after expiration of a timer and/or absent instructions to use another set of operation parameters. For example, the UE 505 may be configured with a set of operation parameters associated with an FD mode as the default set of operation parameters. If the UE 505 then receives an indication to switch to another set of operation parameters (sometimes referred to as a fallback set of operation parameters) associated with an HD mode, such as via explicit signaling, as described in connection with reference number 520, or implicitly, as described in connection with reference number 525, the UE 505 may use the fallback set of operation parameters for a certain time period. Once the certain time period has elapsed, and absent further instruction to continue using the fallback set of operation parameters, the UE 505 may revert back to using the default set of operation parameters. This may beneficially reduce signaling overhead because, when the network entity 510 returns to a default mode from a fallback mode, the UE 505 does not need to be provided with an indication to switch sets of operation parameters and/or does not need to be provided with an indication that the network entity 510 is switching back to a default operation mode. Put another way, the UE 505 may communicate using a first set of operation parameters for a first time period, and the UE 505 may communicate using a second set of operation parameters for a second time period after expiration of the first time period.

As shown by reference number 535, the UE 505 may transmit, to the network entity 510, a communication using a selected one of the multiple sets of operation parameters. That is, the UE 505 may communicate with the network entity 510 using configured operation parameters associated with an operation mode (e.g., an HD mode, an FD mode, or the like) associated with the network entity 510. Moreover, and as described above in connection with reference numbers 520, 525, and 530, the UE 505 may receive explicit or implicit indications to periodically switch between sets of operation parameters. In such aspects, as shown by reference number 540, the UE 505 may transmit, to the network entity 510, another communication using another selected one of the multiple sets of operation parameters. For example, in aspects in which the indication of the selected one of the multiple sets of operation parameters is semi-statically indicated over a time window, the UE 505 may transmit a communication using a selected one of the multiple sets of operation parameters during a first portion of the time window, as shown by reference number 535, and the UE 505 may transmit another communication using another selected one of the multiple sets of operation parameters during a second portion of the time window, as shown by reference number 540.

Based at least in part on the UE 505 being configured with multiple sets of operation parameters and communicating with a network entity 510 using a selected set one of the multiple sets of operation parameters, the UE 505 and/or the network entity 510 may conserve computing, power, network, and/or communication resources that may have otherwise been consumed by signaling overhead. For example, based at least in part on the UE 505 being configured with multiple sets of operation parameters and communicating with a network entity 510 using a selected set one of the multiple sets of operation parameters, the UE 505 and the network entity 510 may communicate without the requiring the UE 505 to be configured with corresponding operation parameters each time the network entity 510 switches between operation modes, which may conserve computing, power, network, and/or communication resources that may have otherwise been consumed to reconfigure the UE 505 each time operation modes are changed.

Moreover, based at least in part on the UE 505 being configured with multiple sets of operation parameters and communicating with a network entity 510 using a selected set one of the multiple sets of operation parameters, the network entity 510 may more effectively switch between BWPs and/or operating modes (e.g., between HD and FD modes, or between a first FD or HD mode and a second FD or HD mode), thereby conserving power and reducing overhead. For example, aspects of the disclosure may result in a power saving gain for UEs (e.g., UE 505) supporting RF BWP adaptation in FR1, FR2, or other frequency ranges, because a network entity (e.g., network entity 510) may easily switch between BWPs. Moreover, aspects of the disclosure may result in an overhead reduction gain for UEs associated with a group common (GC) physical downlink control channel (PDCCH) because multiple operation parameters may be transmitted to multiple UEs using a single PDCCH. This overhead reduction gain may be particularly applicable to UEs operating in FR1 because beam sweeping may not need to be utilized. Moreover, aspects of the disclosure may result in an overhead reduction gain for aspects in which pre-determined HD and FD parameter switching (e.g., in which UEs may be configured with a semi-static pattern or other pattern indicating when the network entity will be operating in each mode) in FR1, FR2, or other frequency ranges, because operational parameters need not be configured and signaled every time the network entity switches between operating modes.

As indicated above, FIG. 5 is provided as an example. Other examples may differ from what is described with respect to FIG. 5.

Figure 6:
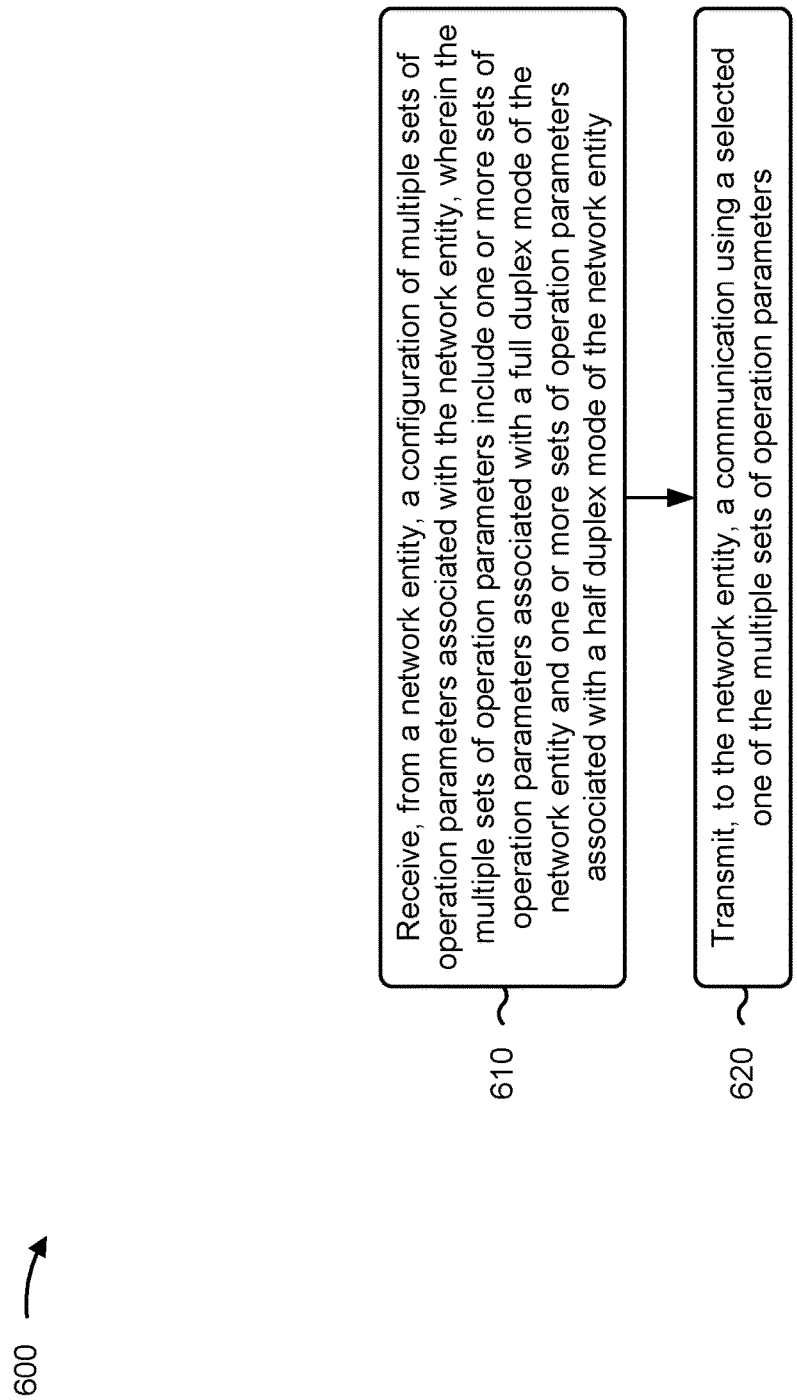
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 505) performs operations associated with configuration of sets of operation parameters for HD and FD modes.

As shown in FIG. 6, in some aspects, process 600 may include receiving, from a network entity (e.g., network entity 510), a configuration of multiple sets of operation parameters associated with the network entity, wherein the multiple sets of operation parameters include one or more sets of operation parameters associated with a full duplex mode of the network entity and one or more sets of operation parameters associated with a half duplex mode of the network entity (block 610). For example, the UE (e.g., using communication manager 808 and/or reception component 802, depicted in FIG. 8) may receive, from a network entity, a configuration of multiple sets of operation parameters associated with the network entity, wherein the multiple sets of operation parameters include one or more sets of operation parameters associated with a full duplex mode of the network entity and one or more sets of operation parameters associated with a half duplex mode of the network entity, as described above.

As further shown in FIG. 6, in some aspects, process 600 may include transmitting, to the network entity, a communication using a selected one of the multiple sets of operation parameters (block 620). For example, the UE (e.g., using communication manager 808 and/or transmission component 804, depicted in FIG. 8) may transmit, to the network entity, a communication using a selected one of the multiple sets of operation parameters, as described above.

Process 600 may include additional aspects, such as any single aspect or any combination of aspects described below and/or in connection with one or more other processes described elsewhere herein.

In a first aspect, the multiple sets of operation parameters indicate at least one of a downlink or uplink power control parameter, a reception or transmission timing parameter, a downlink or uplink beam parameter, a bandwidth part parameter, or a component carrier parameter.

In a second aspect, alone or in combination with the first aspect, the one or more sets of operation parameters associated with the full duplex mode of the network entity include a first set of operation parameters and a second set of operation parameters.

In a third aspect, alone or in combination with one or more of the first and second aspects, the first set of operation parameters is associated with a first guard band size associated with FDMed communications, and the second set of operation parameters is associated with a second guard band size associated with FDMed communications.

In a fourth aspect, alone or in combination with one or more of the first through third aspects, the first set of operation parameters is associated with a first guard band field associated with a bandwidth part identifier information element, and the second set of operation parameters is associated with a second guard band field associated with the bandwidth part identifier information element.

In a fifth aspect, alone or in combination with one or more of the first through fourth aspects, the first set of operation parameters is associated with a first bandwidth part identifier, and the second set of operation parameters is associated with a second bandwidth part identifier.

In a sixth aspect, alone or in combination with one or more of the first through fifth aspects, the one or more sets of operation parameters associated with the half duplex mode of the network entity include a third set of operation parameters and a fourth set of operation parameters.

In a seventh aspect, alone or in combination with one or more of the first through sixth aspects, process 600 includes receiving, from the network entity, an indication of the selected one of the multiple sets of operation parameters.

In an eighth aspect, alone or in combination with one or more of the first through seventh aspects, the indication of the selected one of the multiple sets of operation parameters is received via a UE-dedicated message.

In a ninth aspect, alone or in combination with one or more of the first through eighth aspects, the indication of the selected one of the multiple sets of operation parameters is received via a group common message.

In a tenth aspect, alone or in combination with one or more of the first through ninth aspects, the indication of the selected one of the multiple sets of operation parameters is received by the UE based at least in part on the network entity switching between the full duplex mode and the half duplex mode.

In an eleventh aspect, alone or in combination with one or more of the first through tenth aspects, the indication of the selected one of the multiple sets of operation parameters is semi-statically indicated over a time window.

In a twelfth aspect, alone or in combination with one or more of the first through eleventh aspects, the indication of the selected one of the multiple sets of operation parameters indicates that a first set of operation parameters should be used during a first portion of the time window, and the indication of the selected one of the multiple sets of operation parameters indicates that a second set of operation parameters should be used during a second portion of the time window.

In a thirteenth aspect, alone or in combination with one or more of the first through twelfth aspects, the indication of the selected one of the multiple sets of operation parameters indicates a selected pattern of sets of operation parameters, of multiple patterns of sets of operation parameters, to use during the time window.

In a fourteenth aspect, alone or in combination with one or more of the first through thirteenth aspects, the selected one of the multiple sets of operation parameters is indicated based at least in part on the network entity switching between the full duplex mode and the half duplex mode.

In a fifteenth aspect, alone or in combination with one or more of the first through fourteenth aspects, process 600 includes receiving, from the network entity, an indication that the network entity is switching between the full duplex mode and the half duplex mode.

In a sixteenth aspect, alone or in combination with one or more of the first through fifteenth aspects, process 600 includes determining that the network entity switched between the full duplex mode and the half duplex mode, and selecting the selected one of the multiple sets of operation parameters based at least in part on determining that the network entity switched between the full duplex mode and the half duplex mode.

In a seventeenth aspect, alone or in combination with one or more of the first through sixteenth aspects, the UE communicates using a first set of operation parameters for a first time period, and the UE communicates using a second set of operation parameters for a second time period after expiration of the first time period.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
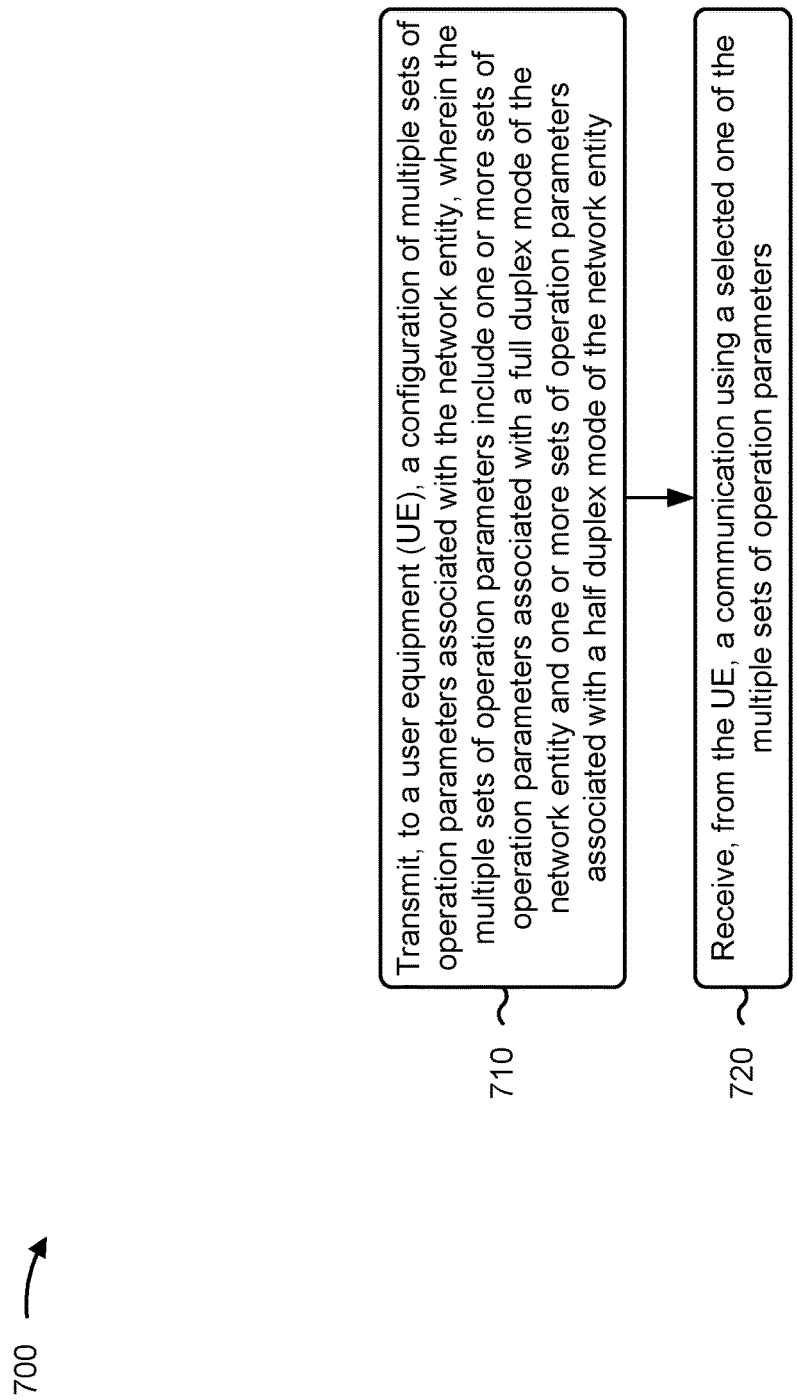
FIG. 7 is a diagram illustrating an example process performed, for example, by a network entity, in accordance with the present disclosure.

FIG. 7 is a diagram illustrating an example process 700 performed, for example, by a network entity, in accordance with the present disclosure. Example process 700 is an example where the network entity (e.g., network entity 510) performs operations associated with configuration of sets of operation parameters for half duplex and full duplex modes.

As shown in FIG. 7, in some aspects, process 700 may include transmitting, to a UE (e.g., UE 505), a configuration of multiple sets of operation parameters associated with the network entity, wherein the multiple sets of operation parameters include one or more sets of operation parameters associated with a full duplex mode of the network entity and one or more sets of operation parameters associated with a half duplex mode of the network entity (block 710). For example, the network entity (e.g., using communication manager 908 and/or transmission component 904, depicted in FIG. 9) may transmit, to a UE, a configuration of multiple sets of operation parameters associated with the network entity, wherein the multiple sets of operation parameters include one or more sets of operation parameters associated with a full duplex mode of the network entity and one or more sets of operation parameters associated with a half duplex mode of the network entity, as described above.

As further shown in FIG. 7, in some aspects, process 700 may include receiving, from the UE, a communication using a selected one of the multiple sets of operation parameters (block 720). For example, the network entity (e.g., using communication manager 908 and/or reception component 902, depicted in FIG. 9) may receive, from the UE, a communication using a selected one of the multiple sets of operation parameters, as described above.

Process 700 may include additional aspects, such as any single aspect or any combination of aspects described below and/or in connection with one or more other processes described elsewhere herein.

In a first aspect, the multiple sets of operation parameters indicate at least one of a downlink or uplink power control parameter, a reception or transmission timing parameter, a downlink or uplink beam parameter, a bandwidth part parameter, or a component carrier parameter.

In a second aspect, alone or in combination with the first aspect, the one or more sets of operation parameters associated with the full duplex mode of the network entity include a first set of operation parameters and a second set of operation parameters.

In a third aspect, alone or in combination with one or more of the first and second aspects, the first set of operation parameters is associated with a first guard band size associated with FDMed communications, and the second set of operation parameters is associated with a second guard band size associated with FDMed communications.

In a fourth aspect, alone or in combination with one or more of the first through third aspects, the first set of operation parameters is associated with a first guard band field associated with a bandwidth part identifier information element, and the second set of operation parameters is associated with a second guard band field associated with the bandwidth part identifier information element.

In a fifth aspect, alone or in combination with one or more of the first through fourth aspects, the first set of operation parameters is associated with a first bandwidth part identifier, and the second set of operation parameters is associated with a second bandwidth part identifier.

In a sixth aspect, alone or in combination with one or more of the first through fifth aspects, the one or more sets of operation parameters associated with the half duplex mode of the network entity include a third set of operation parameters and a fourth set of operation parameters.

In a seventh aspect, alone or in combination with one or more of the first through sixth aspects, process 700 includes transmitting, to the UE, an indication of the selected one of the multiple sets of operation parameters.

In an eighth aspect, alone or in combination with one or more of the first through seventh aspects, the indication of the selected one of the multiple sets of operation parameters is transmitted via a UE-dedicated message.

In a ninth aspect, alone or in combination with one or more of the first through eighth aspects, the indication of the selected one of the multiple sets of operation parameters is transmitted via a group common message.

In a tenth aspect, alone or in combination with one or more of the first through ninth aspects, the indication of the selected one of the multiple sets of operation parameters is transmitted to the UE based at least in part on the network entity switching between the full duplex mode and the half duplex mode.

In an eleventh aspect, alone or in combination with one or more of the first through tenth aspects, the indication of the selected one of the multiple sets of operation parameters is semi-statically indicated over a time window.

In a twelfth aspect, alone or in combination with one or more of the first through eleventh aspects, the indication of the selected one of the multiple sets of operation parameters indicates that a first set of operation parameters should be used during a first portion of the time window, and the indication of the selected one of the multiple sets of operation parameters indicates that a second set of operation parameters should be used during a second portion of the time window.

In a thirteenth aspect, alone or in combination with one or more of the first through twelfth aspects, the indication of the selected one of the multiple sets of operation parameters indicates a selected pattern of sets of operation parameters, of multiple patterns of sets of operation parameters, to use during the time window.

In a fourteenth aspect, alone or in combination with one or more of the first through thirteenth aspects, the selected one of the multiple sets of operation parameters is indicated based at least in part on the network entity switching between the full duplex mode and the half duplex mode.

In a fifteenth aspect, alone or in combination with one or more of the first through fourteenth aspects, process 700 includes transmitting, to the UE, an indication that the network entity is switching between the full duplex mode and the half duplex mode.

In a sixteenth aspect, alone or in combination with one or more of the first through fifteenth aspects, the UE communicates using a first set of operation parameters for a first time period, and the UE communicates using a second set of operation parameters for a second time period after expiration of the first time period.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
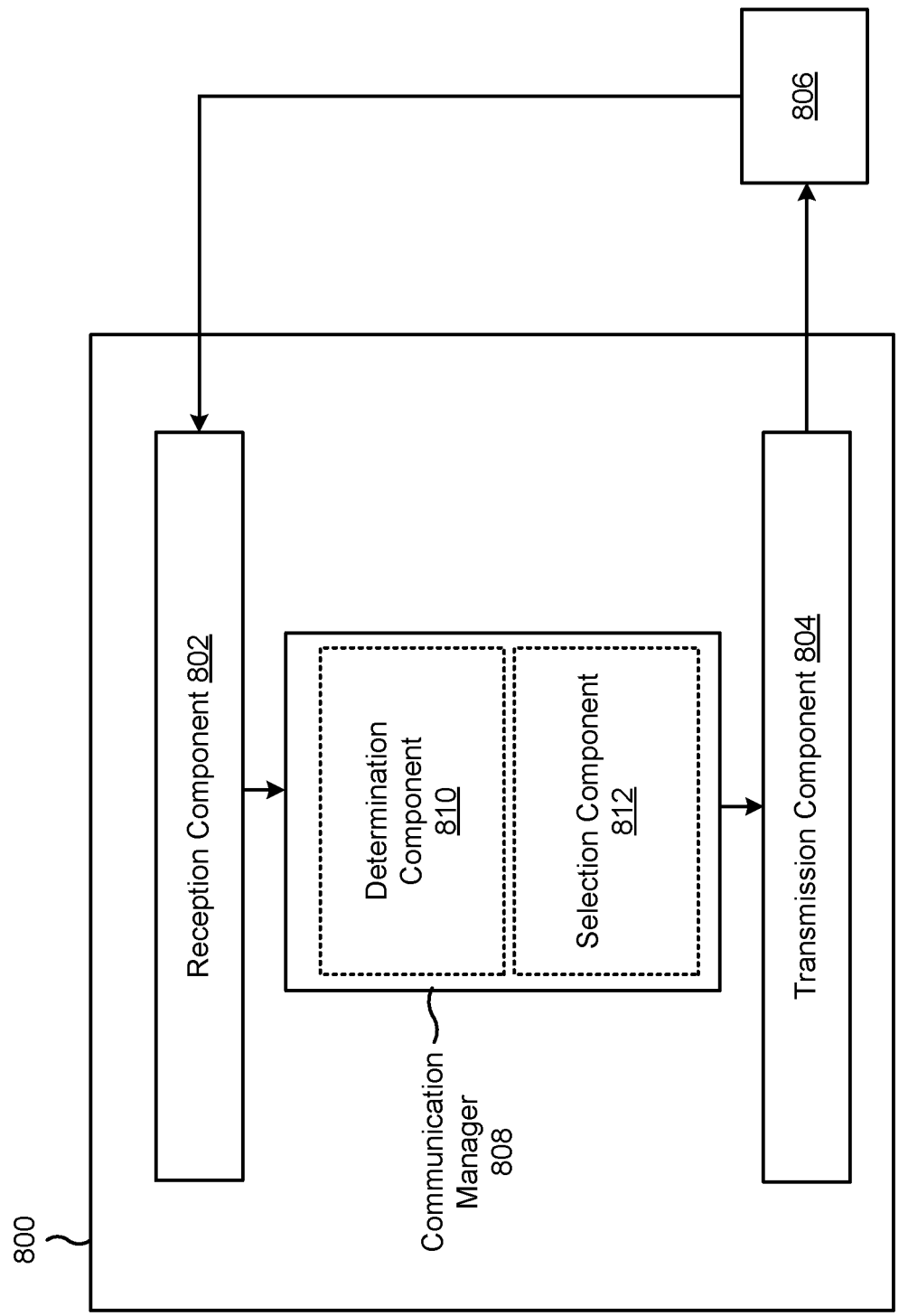
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a UE (e.g., UE 505), or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 908 (e.g., communication manager 140). The communication manager 908 may include one or more of a determination component 810, or a selection component 812, among other examples.

In some aspects, the apparatus 800 may be configured to perform one or more operations described herein in connection with FIG. 5. Additionally, or alternatively, the apparatus 800 may be configured to perform one or more processes described herein, such as process 600 of 6. In some aspects, the apparatus 800 and/or one or more components shown in FIG. 8 may include one or more components of the UE 120 described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE 120 described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE 120 described in connection with FIG. 2. In some aspects, the transmission component 804 may be co-located with the reception component 802 in a transceiver.

The reception component 802 may receive, from a network entity, a configuration of multiple sets of operation parameters associated with the network entity, wherein the multiple sets of operation parameters include one or more sets of operation parameters associated with a full duplex mode of the network entity and one or more sets of operation parameters associated with a half duplex mode of the network entity. The transmission component 804 may transmit, to the network entity, a communication using a selected one of the multiple sets of operation parameters.

The reception component 802 may receive, from the network entity, an indication of the selected one of the multiple sets of operation parameters.

The reception component 802 may receive, from the network entity, an indication that the network entity is switching between the full duplex mode and the half duplex mode.

The determination component 810 may determine that the network entity switched between the full duplex mode and the half duplex mode.

The selection component 812 may select the selected one of the multiple sets of operation parameters based at least in part on determining that the network entity switched between the full duplex mode and the half duplex mode.

The number and arrangement of components shown in FIG. 8 are provided as an example. In practice, there may be additional components, fewer components, different components, or differently arranged components than those shown in FIG. 8.

Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
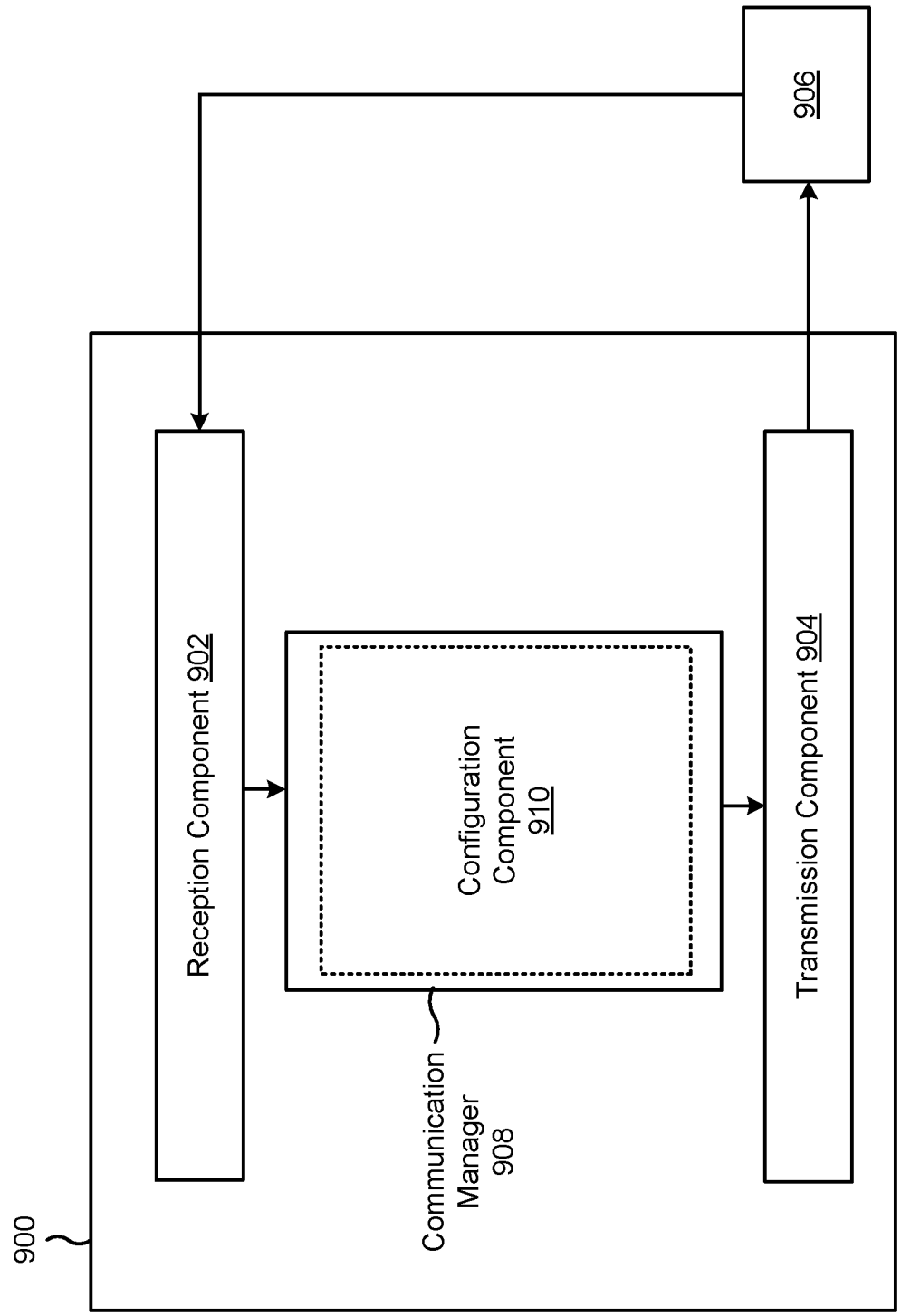
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a network entity (e.g., network entity 510), or a network entity may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 908 (e.g., communication manager 150). The communication manager 908 may include a configuration component 910, among other examples.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the base station 110 described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the base station 110 described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station 110 described in connection with FIG. 2. In some aspects, the transmission component 904 may be co-located with the reception component 902 in a transceiver.

The transmission component 904 and/or the configuration component 910 may transmit, to a UE, a configuration of multiple sets of operation parameters associated with the network entity, wherein the multiple sets of operation parameters include one or more sets of operation parameters associated with a full duplex mode of the network entity and one or more sets of operation parameters associated with a half duplex mode of the network entity. The reception component 902 may receive, from the UE, a communication using a selected one of the multiple sets of operation parameters.

The transmission component 904 and/or the configuration component 910 may transmit, to the UE, an indication of the selected one of the multiple sets of operation parameters.

The transmission component 904 may transmit, to the UE, an indication that the network entity is switching between the full duplex mode and the half duplex mode.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a UE comprising: receiving, from a network entity, a configuration of multiple sets of operation parameters associated with the network entity, wherein the multiple sets of operation parameters include one or more sets of operation parameters associated with a full duplex mode of the network entity and one or more sets of operation parameters associated with a half duplex mode of the network entity; and transmitting, to the network entity, a communication using a selected one of the multiple sets of operation parameters.

Aspect 2: The method of Aspect 1, wherein the multiple sets of operation parameters indicate at least one of a downlink or uplink power control parameter, a reception or transmission timing parameter, a downlink or uplink beam parameter, a bandwidth part parameter, or a component carrier parameter.

Aspect 3: The method of any of Aspects 1-2, wherein the one or more sets of operation parameters associated with the full duplex mode of the network entity include a first set of operation parameters and a second set of operation parameters.

Aspect 4: The method of Aspect 3, wherein the first set of operation parameters is associated with a first guard band size associated with FDMed communications, and wherein the second set of operation parameters is associated with a second guard band size associated with FDMed communications.

Aspect 5: The method of Aspect 4, wherein the first set of operation parameters is associated with a first guard band field associated with a bandwidth part identifier information element, and wherein the second set of operation parameters is associated with a second guard band field associated with the bandwidth part identifier information element.

Aspect 6: The method of Aspect 4, wherein the first set of operation parameters is associated with a first bandwidth part identifier, and wherein the second set of operation parameters is associated with a second bandwidth part identifier.

Aspect 7: The method of any of Aspects 3-6, wherein the one or more sets of operation parameters associated with the half duplex mode of the network entity include a third set of operation parameters and a fourth set of operation parameters.

Aspect 8: The method of any of Aspects 1-7, further comprising receiving, from the network entity, an indication of the selected one of the multiple sets of operation parameters.

Aspect 9: The method of Aspect 8, wherein the indication of the selected one of the multiple sets of operation parameters is received via a UE-dedicated message.

Aspect 10: The method of Aspect 8, wherein the indication of the selected one of the multiple sets of operation parameters is received via a group common message.

Aspect 11: The method of any of Aspects 8-10, wherein the indication of the selected one of the multiple sets of operation parameters is received by the UE based at least in part on the network entity switching between the full duplex mode and the half duplex mode.

Aspect 12: The method of any of Aspects 8-11, wherein the indication of the selected one of the multiple sets of operation parameters is semi-statically indicated over a time window.

Aspect 13: The method of Aspect 12, wherein the indication of the selected one of the multiple sets of operation parameters indicates that a first set of operation parameters should be used during a first portion of the time window, and wherein the indication of the selected one of the multiple sets of operation parameters indicates that a second set of operation parameters should be used during a second portion of the time window.

Aspect 14: The method of any of Aspects 12-13, wherein the indication of the selected one of the multiple sets of operation parameters indicates a selected pattern of sets of operation parameters, of multiple patterns of sets of operation parameters, to use during the time window.

Aspect 15: The method of any of Aspects 1-14, wherein the selected one of the multiple sets of operation parameters is indicated based at least in part on the network entity switching between the full duplex mode and the half duplex mode.

Aspect 16: The method of Aspect 15, further comprising receiving, from the network entity, an indication that the network entity is switching between the full duplex mode and the half duplex mode.

Aspect 17: The method of any of Aspects 15-16, further comprising: determining that the network entity switched between the full duplex mode and the half duplex mode; and selecting the selected one of the multiple sets of operation parameters based at least in part on determining that the network entity switched between the full duplex mode and the half duplex mode.

Aspect 18: The method of any of Aspects 1-17, wherein the UE communicates using a first set of operation parameters for a first time period, and wherein the UE communicates using a second set of operation parameters for a second time period after expiration of the first time period.

Aspect 19: A method of wireless communication performed by a network entity, comprising: transmitting, to a UE, a configuration of multiple sets of operation parameters associated with the network entity, wherein the multiple sets of operation parameters include one or more sets of operation parameters associated with a full duplex mode of the network entity and one or more sets of operation parameters associated with a half duplex mode of the network entity; and receiving, from the UE, a communication using a selected one of the multiple sets of operation parameters.

Aspect 20: The method of Aspect 19, wherein the multiple sets of operation parameters indicate at least one of a downlink or uplink power control parameter, a reception or transmission timing parameter, a downlink or uplink beam parameter, a bandwidth part parameter, or a component carrier parameter.

Aspect 21: The method of any of Aspects 19-20, wherein the one or more sets of operation parameters associated with the full duplex mode of the network entity include a first set of operation parameters and a second set of operation parameters.

Aspect 22: The method of Aspect 21, wherein the first set of operation parameters is associated with a first guard band size associated with FDMed communications, and wherein the second set of operation parameters is associated with a second guard band size associated with FDMed communications.

Aspect 23: The method of Aspect 22, wherein the first set of operation parameters is associated with a first guard band field associated with a bandwidth part identifier information element, and wherein the second set of operation parameters is associated with a second guard band field associated with the bandwidth part identifier information element.

Aspect 24: The method of Aspect 22, wherein the first set of operation parameters is associated with a first bandwidth part identifier, and wherein the second set of operation parameters is associated with a second bandwidth part identifier.

Aspect 25: The method of any of Aspects 21-24, wherein the one or more sets of operation parameters associated with the half duplex mode of the network entity include a third set of operation parameters and a fourth set of operation parameters.

Aspect 26: The method of any of Aspects 19-25, further comprising transmitting, to the UE, an indication of the selected one of the multiple sets of operation parameters.

Aspect 27: The method of Aspect 26, wherein the indication of the selected one of the multiple sets of operation parameters is transmitted via a UE-dedicated message.

Aspect 28: The method of Aspect 26, wherein the indication of the selected one of the multiple sets of operation parameters is transmitted via a group common message.

Aspect 29: The method of any of Aspects 26-28, wherein the indication of the selected one of the multiple sets of operation parameters is transmitted to the UE based at least in part on the network entity switching between the full duplex mode and the half duplex mode.

Aspect 30: The method of any of Aspects 26-29, wherein the indication of the selected one of the multiple sets of operation parameters is semi-statically indicated over a time window.

Aspect 31: The method of Aspect 30, wherein the indication of the selected one of the multiple sets of operation parameters indicates that a first set of operation parameters should be used during a first portion of the time window, and wherein the indication of the selected one of the multiple sets of operation parameters indicates that a second set of operation parameters should be used during a second portion of the time window.

Aspect 32: The method of any of Aspects 30-31, wherein the indication of the selected one of the multiple sets of operation parameters indicates a selected pattern of sets of operation parameters, of multiple patterns of sets of operation parameters, to use during the time window.

Aspect 33: The method of any of Aspects 19-32, wherein the selected one of the multiple sets of operation parameters is indicated based at least in part on the network entity switching between the full duplex mode and the half duplex mode.

Aspect 34: The method of Aspect 33, further comprising transmitting, to the UE, an indication that the network entity is switching between the full duplex mode and the half duplex mode.

Aspect 35: The method of any of Aspects 19-34, wherein the UE communicates using a first set of operation parameters for a first time period, and wherein the UE communicates using a second set of operation parameters for a second time period after expiration of the first time period.

Aspect 36: An apparatus for wireless communication at a device, comprising a processor; memory coupled with the processor; and instructions stored in the memory and executable by the processor to cause the apparatus to perform the method of one or more of Aspects 1-18.

Aspect 37: A device for wireless communication, comprising a memory and one or more processors coupled to the memory, the one or more processors configured to perform the method of one or more of Aspects 1-18.

Aspect 38: An apparatus for wireless communication, comprising at least one means for performing the method of one or more of Aspects 1-18.

Aspect 39: A non-transitory computer-readable medium storing code for wireless communication, the code comprising instructions executable by a processor to perform the method of one or more of Aspects 1-18.

Aspect 40: A non-transitory computer-readable medium storing a set of instructions for wireless communication, the set of instructions comprising one or more instructions that, when executed by one or more processors of a device, cause the device to perform the method of one or more of Aspects 1-18.

Aspect 41: An apparatus for wireless communication at a device, comprising a processor; memory coupled with the processor; and instructions stored in the memory and executable by the processor to cause the apparatus to perform the method of one or more of Aspects 19-35.

Aspect 42: A device for wireless communication, comprising a memory and one or more processors coupled to the memory, the one or more processors configured to perform the method of one or more of Aspects 19-35.

Aspect 43: An apparatus for wireless communication, comprising at least one means for performing the method of one or more of Aspects 19-35.

Aspect 44: A non-transitory computer-readable medium storing code for wireless communication, the code comprising instructions executable by a processor to perform the method of one or more of Aspects 19-35.

Aspect 45: A non-transitory computer-readable medium storing a set of instructions for wireless communication, the set of instructions comprising one or more instructions that, when executed by one or more processors of a device, cause the device to perform the method of one or more of Aspects 19-35.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors coupled to the memory, the memory comprising instructions executable by the one or more processors to cause the apparatus to:
   receive, from a network entity, a configuration of multiple sets of operation parameters associated with the network entity, wherein the multiple sets of operation parameters include one or more sets of operation parameters associated with a full duplex mode of the network entity and one or more sets of operation parameters associated with a half duplex mode of the network entity; and
   transmit, to the network entity, a communication using a selected one of the multiple sets of operation parameters,
   wherein the one or more sets of operation parameters associated with the full duplex mode of the network entity include a first set of operation parameters and a second set of operation parameters, and
   wherein the first set of operation parameters is associated with a first guard band size associated with frequency division multiplexed (FDMed) communications, and wherein the second set of operation parameters is associated with a second guard band size associated with FDMed communications.

2. The apparatus of claim 1, wherein the multiple sets of operation parameters indicate at least one of a downlink or uplink power control parameter, a reception or transmission timing parameter, a downlink or uplink beam parameter, a bandwidth part parameter, or a component carrier parameter.

3. The apparatus of claim 1, wherein the first set of operation parameters is associated with a first guard band field associated with a bandwidth part identifier information element, and wherein the second set of operation parameters is associated with a second guard band field associated with the bandwidth part identifier information element.

4. The apparatus of claim 1, wherein the first set of operation parameters is associated with a first bandwidth part identifier, and wherein the second set of operation parameters is associated with a second bandwidth part identifier.

5. The apparatus of claim 1, wherein the one or more sets of operation parameters associated with the half duplex mode of the network entity include a third set of operation parameters and a fourth set of operation parameters.

6. The apparatus of claim 1, wherein the one or more processors are further configured to receive, from the network entity, an indication of the selected one of the multiple sets of operation parameters.

7. The apparatus of claim 6, wherein the indication of the selected one of the multiple sets of operation parameters is received via a UE-dedicated message.

8. The apparatus of claim 6, wherein the indication of the selected one of the multiple sets of operation parameters is received via a group common message.

9. The apparatus of claim 6, wherein the indication of the selected one of the multiple sets of operation parameters is received by the UE based at least in part on the network entity switching between the full duplex mode and the half duplex mode.

10. The apparatus of claim 6, wherein the indication of the selected one of the multiple sets of operation parameters is semi-statically indicated over a time window.

11. The apparatus of claim 10, wherein the indication of the selected one of the multiple sets of operation parameters indicates that a first set of operation parameters should be used during a first portion of the time window, and wherein the indication of the selected one of the multiple sets of operation parameters indicates that a second set of operation parameters should be used during a second portion of the time window.

12. The apparatus of claim 10, wherein the indication of the selected one of the multiple sets of operation parameters indicates a selected pattern of sets of operation parameters, of multiple patterns of sets of operation parameters, to use during the time window.

13. The apparatus of claim 1, wherein the selected one of the multiple sets of operation parameters is indicated based at least in part on the network entity switching between the full duplex mode and the half duplex mode.

14. The apparatus of claim 13, wherein the one or more processors are further configured to receive, from the network entity, an indication that the network entity is switching between the full duplex mode and the half duplex mode.

15. The apparatus of claim 13, wherein the one or more processors are further configured to:
   determine that the network entity switched between the full duplex mode and the half duplex mode; and
   select the selected one of the multiple sets of operation parameters based at least in part on determining that the network entity switched between the full duplex mode and the half duplex mode.

16. The apparatus of claim 1, wherein the UE communicates using a first set of operation parameters for a first time period, and wherein the UE communicates using a second set of operation parameters for a second time period after expiration of the first time period.

17. An apparatus for wireless communication at a network entity, comprising:
   a memory; and
   one or more processors coupled to the memory, the memory comprising instructions executable by the one or more processors to cause the apparatus to:
   transmit, to a user equipment (UE), a configuration of multiple sets of operation parameters associated with the network entity, wherein the multiple sets of operation parameters include one or more sets of operation parameters associated with a full duplex mode of the network entity and one or more sets of operation parameters associated with a half duplex mode of the network entity; and receive, from the UE, a communication using a selected one of the multiple sets of operation parameters;

wherein the one or more sets of operation parameters associated with the full duplex mode of the network entity include a first set of operation parameters and a second set of operation parameters, and wherein the first set of operation parameters is associated with a first guard band size associated with frequency division multiplexed (FDMed) communications, and wherein the second set of operation parameters is associated with a second guard band size associated with FDMed communications.

18. The apparatus of claim 17, wherein the multiple sets of operation parameters indicate at least one of a downlink or uplink power control parameter, a reception or transmission timing parameter, a downlink or uplink beam parameter, a bandwidth part parameter, or a component carrier parameter.

19. The apparatus of claim 17, wherein the one or more processors are further configured to transmit, to the UE, an indication of the selected one of the multiple sets of operation parameters.

20. The apparatus of claim 19, wherein the indication of the selected one of the multiple sets of operation parameters is semi-statically indicated over a time window.

21. The apparatus of claim 20, wherein the indication of the selected one of the multiple sets of operation parameters indicates a selected pattern of sets of operation parameters, of multiple patterns of sets of operation parameters, to use during the time window.

22. The apparatus of claim 17, wherein the selected one of the multiple sets of operation parameters is indicated based at least in part on the network entity switching between the full duplex mode and the half duplex mode.

23. A method of wireless communication performed by a user equipment (UE), comprising:
receiving, from a network entity, a configuration of multiple sets of operation parameters associated with the network entity, wherein the multiple sets of operation parameters include one or more sets of operation parameters associated with a full duplex mode of the network entity and one or more sets of operation parameters associated with a half duplex mode of the network entity; and transmitting, to the network entity, a communication using a selected one of the multiple sets of operation parameters, wherein the one or more sets of operation parameters associated with the full duplex mode of the network entity include a first set of operation parameters and a second set of operation parameters, and wherein the first set of operation parameters is associated with a first guard band size associated with frequency division multiplexed (FDMed) communications, and wherein the second set of operation parameters is associated with a second guard band size associated with FDMed communications.

24. The method of claim 23, wherein the multiple sets of operation parameters indicate at least one of a downlink or uplink power control parameter, a reception or transmission timing parameter, a downlink or uplink beam parameter, a bandwidth part parameter, or a component carrier parameter.

25. A method of wireless communication performed by a network entity, comprising:
transmitting, to a user equipment (UE), a configuration of multiple sets of operation parameters associated with the network entity, wherein the multiple sets of operation parameters include one or more sets of operation parameters associated with a full duplex mode of the network entity and one or more sets of operation parameters associated with a half duplex mode of the network entity; and receiving, from the UE, a communication using a selected one of the multiple sets of operation parameters;

wherein the one or more sets of operation parameters associated with the full duplex mode of the network entity include a first set of operation parameters and a second set of operation parameters, and wherein the first set of operation parameters is associated with a first guard band size associated with frequency division multiplexed (FDMed) communications, and wherein the second set of operation parameters is associated with a second guard band size associated with FDMed communications.

26. The method of claim 25, wherein the multiple sets of operation parameters indicate at least one of a downlink or uplink power control parameter, a reception or transmission timing parameter, a downlink or uplink beam parameter, a bandwidth part parameter, or a component carrier parameter.

* * * * *